US008595773B1

(12) United States Patent
Wang et al.

(10) Patent No.: US 8,595,773 B1
(45) Date of Patent: Nov. 26, 2013

(54) INTELLIGENT TV SHOPPING SYSTEM AND METHOD

(75) Inventors: Haohong Wang, San Jose, CA (US); Jim Xiao, Cupertino, CA (US)

(73) Assignee: TCL Research America Inc., Santa Clara, CA (US)

(*) Notice: Subject to any disclaimer, the term of this patent is extended or adjusted under 35 U.S.C. 154(b) by 0 days.

(21) Appl. No.: 13/559,585

(22) Filed: Jul. 26, 2012

(51) Int. Cl.
*H04N 5/445* (2011.01)
*G06F 3/00* (2006.01)

(52) U.S. Cl.
USPC .............. 725/60; 705/26.1; 715/719

(58) Field of Classification Search
None
See application file for complete search history.

(56) References Cited

U.S. PATENT DOCUMENTS

| | | | |
|---|---|---|---|
| 6,549,643 B1* | 4/2003 | Toklu et al. | 382/107 |
| 8,172,675 B2 | 5/2012 | Migos et al. | |
| 2002/0167540 A1* | 11/2002 | Dobbelaar | 345/716 |
| 2004/0123320 A1* | 6/2004 | Daily et al. | 725/61 |
| 2010/0057692 A1 | 3/2010 | Yoon et al. | |
| 2010/0153831 A1* | 6/2010 | Beaton | 715/201 |
| 2012/0143693 A1 | 6/2012 | Chung et al. | |

FOREIGN PATENT DOCUMENTS

| | | |
|---|---|---|
| CN | 200710196237.1 | 10/2008 |
| CN | 200880013057.8 | 5/2010 |
| JP | 2011-95814 | 5/2011 |

\* cited by examiner

*Primary Examiner* — Robert Hance
(74) *Attorney, Agent, or Firm* — Anova Law Group, PLLC (57) ABSTRACT

A method for an intelligent user-interaction control system includes generating a plurality of summary video frames for a certain time of incoming bit-stream of a video program to be shown on a display, and detecting a hold command from a user to stop the video program. The method also includes presenting the plurality of summary video frames to the user on the display after stopping the video program, obtaining a user selection on a selected summary frame from the plurality of the summary video frames, presenting a plurality of objects of interest from the selected summary frame to the user on the display, and determining a user-selected object of interest from the plurality of objects of interest. The method also includes searching the selected object in an online database to obtain searching results corresponding to the selected object, and prompting the user about the searching results.

21 Claims, 5 Drawing Sheets

INTELLIGENT TV SHOPPING SYSTEM AND METHOD

FIELD OF THE INVENTION

The present invention relates to the field of television and user interface technologies and, more particularly, to techniques for intelligent user-interaction control systems and methods.

BACKGROUND

Shopping via TV has been in existence for a long time however never being seriously realized for a large population, even when online shopping via computers has been quite mature in the recent years. The major barriers for TV shopping may be the awkward user interaction mechanism of TV via remote control, as well as people's traditional recognition of TV as a home entertainment platform but not an operation platform. As we are moving into the era of smart devices including smart TVs, the current TV shopping model may be out-of-dated.

In recent years, contents can be rent or purchased via TV. People are looking into shopping business as a natural extension of the content business and hope to use home TV as a supporting facility. Some shopping vendors made downloadable applications for TV (e.g., iPhone or Android applications). However, due to the difficulty in using TV remote controls, it may be questionable how this approach can compete with online shopping via PCs or mobile phones. Some other vendors proposed to collect coupons automatically for a user based on the user's selection when watching TV, and the user has to click a specific button on the remote control before the ending of the merchandise advertisement TV program to lock in the specific coupon. However, this approach may put users into an alert mood, which may destroy the main principle that TV watching is a relaxed experience for fun.

The disclosed methods and systems are directed to solve one or more problems set forth above and other problems

BRIEF SUMMARY OF THE DISCLOSURE

One aspect of the present disclosure includes a method for an intelligent user-interaction control system. The method includes generating a plurality of summary video frames for a certain time of incoming bit-stream of a video program to be shown on a display, and detecting a hold command from a user to stop the video program. The method also includes presenting the plurality of summary video frames to the user on the display after stopping the video program, and obtaining a user selection on a selected summary frame from the plurality of the summary video frames. Further, the method includes presenting a plurality of objects of interest from the selected summary frame to the user on the display, and determining a user-selected object of interest from the plurality of objects of interest. The method also includes searching the selected object in an online database to obtain searching results corresponding to the selected object, and prompting the user about the searching results.

Another aspect of the present disclosure includes an intelligent user-interaction control system. The intelligent user-interaction control system includes a data storage, an object abstraction module, a user experience (UE) handler, and a visual search engine. The data storage is configured to store a certain time of incoming bit-stream of a video program to be shown to a user on a display. The object abstraction module is configured to generate a plurality of summary video frames for the certain time of incoming bit-stream of a video program. Further, the UE handler is configured to detect a hold command from the user to stop the video program; to present the plurality of summary video frames to the user on the display after stopping the video program; to obtain a user selection on a selected summary frame from the plurality of the summary video frames; to present a plurality of objects of interest from the selected summary frame to the user on the display; and to determine a user-selected object of interest from the plurality of objects of interest. The visual search engine is configured to search the selected object in an online database and to return searching results corresponding to the selected object, and the UE handler is further configured to prompt the user about the searching results.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
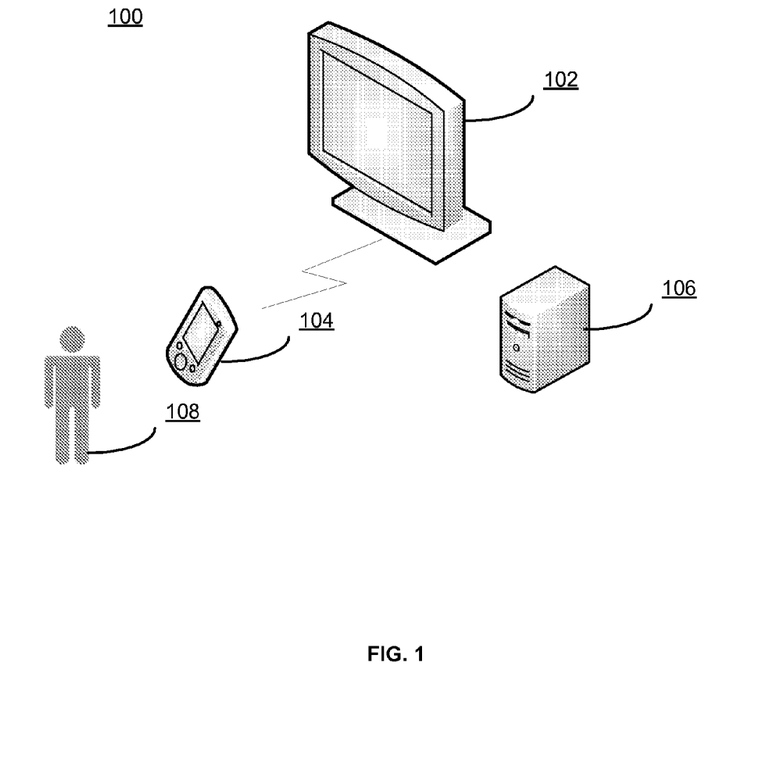
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, and a user 108. Optionally, environment 100 may include a network device 106.

TV 102 may include any appropriate type of TV, such as plasma TV, LCD TV, projection TV, non-smart TV, or smart TV. TV 102 may also include other computing system, such as a personal computer (PC), a tablet or mobile computer, or a server, etc.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

To watch TV 102 and to perform an activity of interest, such as shopping, on TV 102, the user 108 may first pick up the remote control 104, hold the remote control 104, and then use the remote control 104 to control TV 102 to perform the activity of interest, or the user may simply use hand or body gestures to control TV 102 if motion sensor or depth-camera is used. During this process, the user 108 may interact with the TV 102 and/or network device 106.

Further, the optional network device 106 may include any appropriate type of computing or consumer electronic device to facilitate the communication, data storage, and data processing between the remote control 104 and TV 102. TV 102, remote control 104, and network device 106 may communicate with each other through one or more communication networks.

Figure 2:
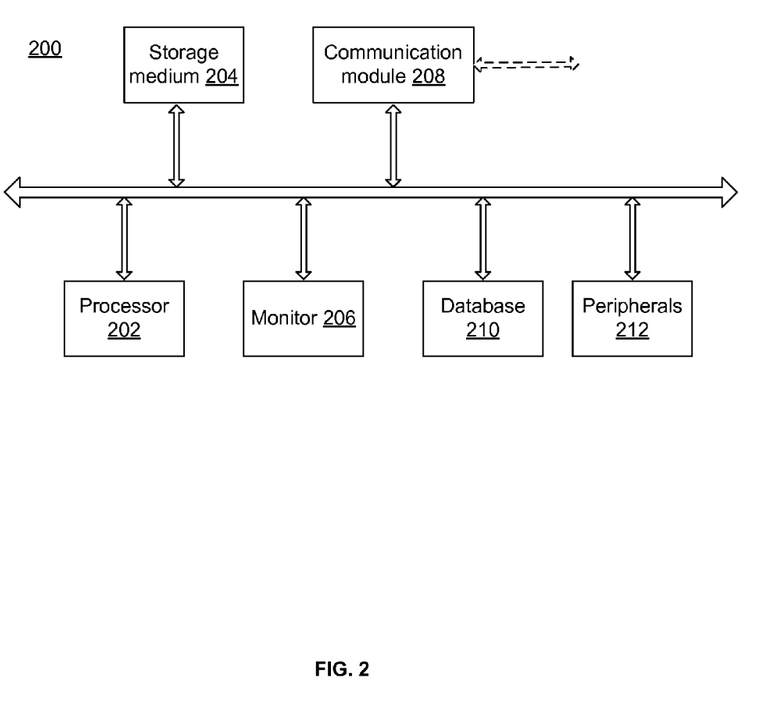
FIG. 2 illustrates an exemplary computing system consistent with the disclosed embodiments.

TV 102, remote control 104, and/or network device 106 may be implemented on any appropriate computing circuitry platform. FIG. 2 shows a block diagram of an exemplary computing system 200 capable of implementing TV 102, remote control 104, and/or network device 106.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
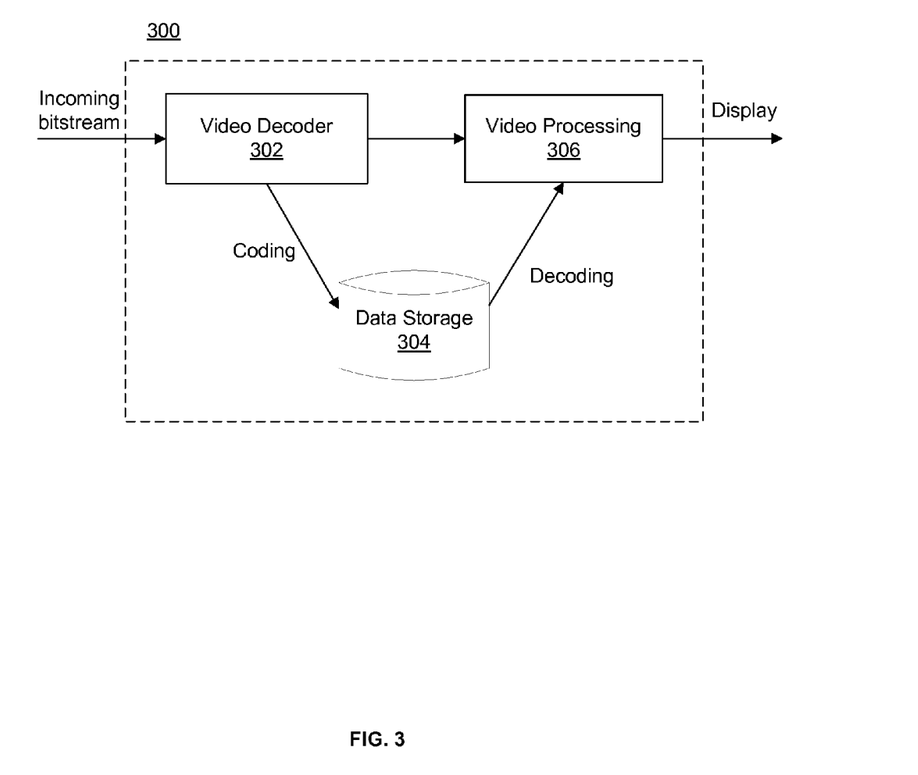
FIG. 3 illustrates an exemplary video processing module consistent with the disclosed embodiments.

FIG. 3 illustrates an exemplary video processing module 300 in TV 102 consistent with the disclosed embodiments. As shown in FIG. 3, video processing module 300 includes a video decoder 302, a data storage 304, a video processing unit 306. Other components may be added.

The video decoder 302 may include any appropriate video decoding circuitry to decode the incoming bit stream to TV 102. After the bit stream is decoded, the data is provided to video processing unit 306 to render video data ready for display. Further, data storage 304 may include any appropriate storage medium (e.g., storage medium 204, database 210) to store video data. The video data may be coded before being stored in the data storage 304 and the stored video data may be decoded before being provided to the video processing unit 306 for display.

This configuration of video decoder 302, data storage 304, and video processing unit 306 may be used to implement a time-shift function in TV 102. The user may hold on the playback of a live broadcasting video for a certain amount of time (e.g., a few seconds, minutes, or hours), and the data storage 304 may store or buffer the video data between decoding and display while the live broadcasting video is on hold by the user 108.

Figure 4:
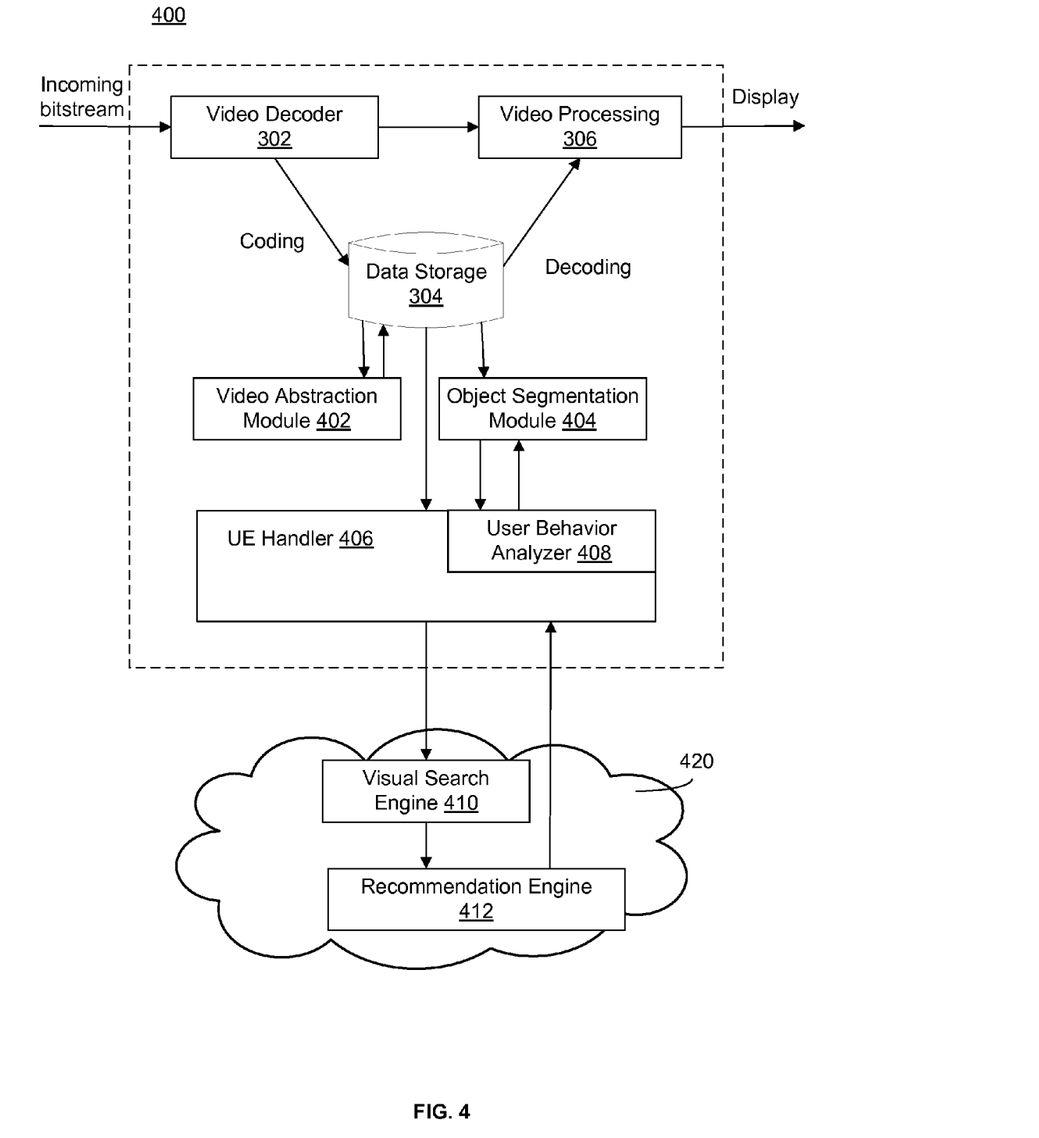
FIG. 4 illustrates an exemplary intelligent TV shopping control system consistent with the disclosed embodiments.

FIG. 4 illustrates an exemplary intelligent TV shopping control system 400 consistent with the disclosed embodiments. As shown in FIG. 4, control system 400 includes video decoder 302, data storage 304, and video processing unit 306, as previously described. The control system 400 also includes a video abstraction module 402, an object segmentation module 404, and a user experience (UE) handler 406. The UE handler 406 also includes a user behavior analyzer 408.

Further, the control system 400 includes a visual search engine 410 and a recommendation engine 412. The visual search engine 410 and/or recommendation engine 412 may reside within TV 102 or outside TV 102, such as in a computing cloud 420 or in network device 106. Certain components may be omitted and other components may be added. The control system 400 (e.g., the various components) may be implemented in hardware, software, or a combination of hardware and software.

The video abstraction module 402 may be configured to summarize the past a few or any number of minutes of video data stored in the data storage 304 module into a few representative video frames for the user to select when the user tries to rewind the TV program. That is, the video abstraction module 402 may automatically select representative frames from a large number of video frames (assuming the video is playback at 30 frame/sec, there are 1800 frames for 1 minute video clip) such that the user interaction is significantly reduced.

The object segmentation module 404 may be configured to automatically detect a current region of interest for the user such that the user can specify the object that he/she is exploring in substantial less amount of time. The object segmentation module 404 may reside within TV 102 or outside the TV 102 depending on particular applications.

The UE handler 406 may be configured to handle user interactions with the control system 400. For example, the UE handler 406 may provide interfaces for the commands of holding TV programs, rewinding, object selection, receiving recommendation information, and detecting user's shopping selection, and so on. In addition, being built in the UE handler 406, the user behavior analyzer 408 may be configured to understand user's preferences on object selection and thus to improve the future object segmentation process.

Further, the visual search engine 410 may be configured to search one or more online databases to match the visual object that the user specified in the catalog or other TV programs. The visual search engine 410 may be configured to find the best match or to find a match with a matching percentage above a predetermined threshold. The matching may be performed based a variety of criteria, such as name, type, shape, look, price, brand, and manufacturer, etc. The recommendation engine 412 may be configured to recommend relative objects, such as those objects look similar to, in the similar price range as, or complimentary to the object(s) selected by the user.

In operation, the video abstraction module 402 may generate summary frames for one or more past video clips. When the user 108 requests to hold TV program via the UE handler 406, the corresponding summary frames may be presented on the display for the user 108 to select. When a specific frame is selected by the user 108, the objects in the frame may be segmented automatically by the object segmentation module 404, and the user can pick an object that he/she is currently interested. The information of the object (e.g., image, pixel map, or description) is then sent to the visual search engine 410.

The visual search engine 410 finds matched objects (e.g., merchandise) from one or more online databases and pass the information to the recommendation engine 412. The recommendation engine 412 may then make recommendations to the user via the UE handler 406 according to the user preference as well as the available related objects. The user can either make purchase decision based on the recommendations or choose to continue watching TV program and perform the purchase at a later time.

A short use scenario may be illustrative on the above described operation. When a user is watching a TV program, for example, a fashion channel with celebrities and high-end clothes, bags, shoes and so on, the user sees something interesting. The user can hold the TV program, rewind the video frames back to find the object (merchandise or the celebrity) that is interested to the user, pick the object, and start searching. The user then goes back to watch the TV program. This entire process may only takes a couple of minutes, thus has minimum impact on the user's TV watching experience. Once the system finds the relevant information regarding to the object, for example, the lowest price on the market, and/or similar or relevant merchandise available for recommendation, a message icon may be shown on the bottom of the TV. The user can choose to ignore the message until completing the TV program, or to hold the TV program again and start browsing the recommendation and even making purchase orders. The user can make the order by simply clicking a button or using a gesture, and go back to the TV program by resuming the TV program from the stopping point. Thus, a so-called rewind-pick-go model for the online TV shopping can be realized.

Figure 5:
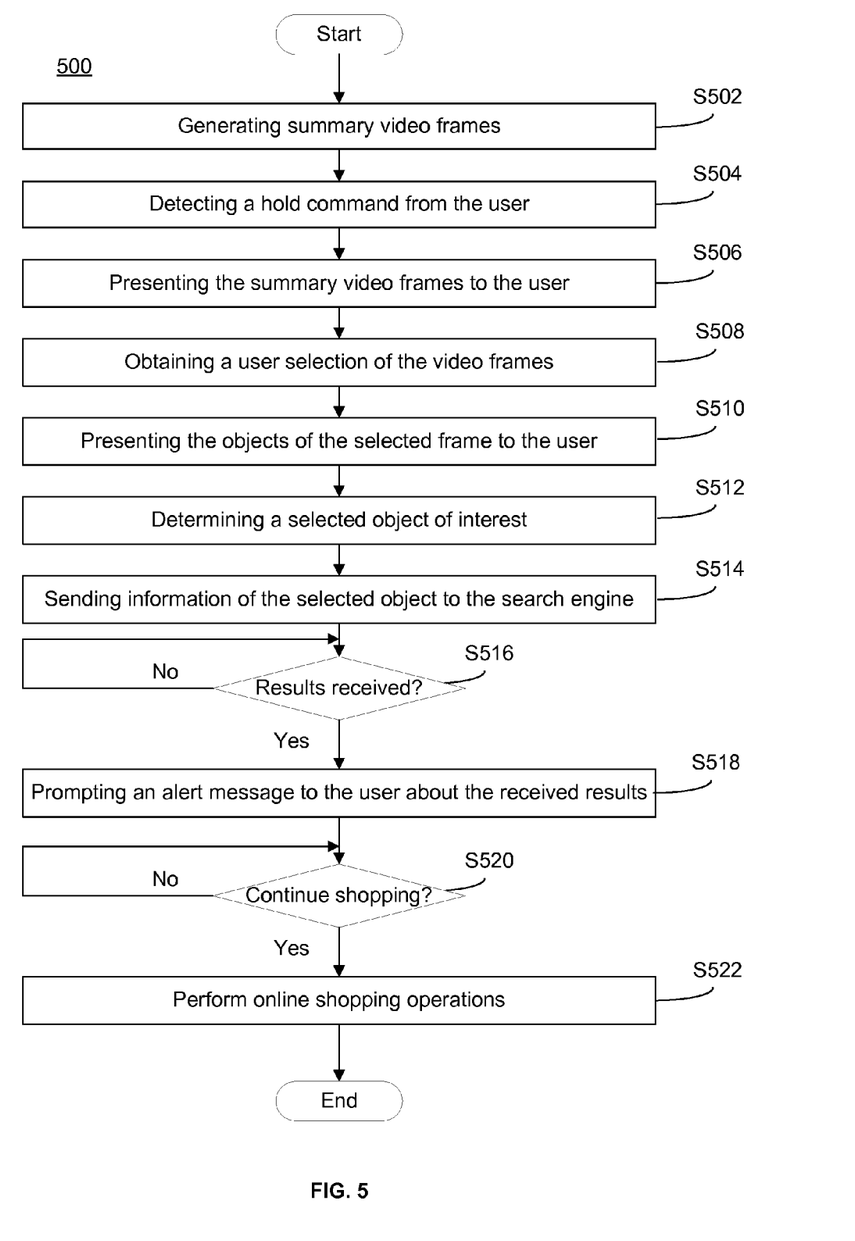
FIG. 5 illustrates an exemplary operating process of an intelligent TV shopping control system consistent with the disclosed embodiments.

More particularly, FIG. 5 illustrates an exemplary operating process 500 consistent with the disclosed embodiments. As shown in FIG. 5, at the beginning of the process 500, summary video frames of a video clip are generated by the video abstraction module 402 (S502). The number of summary video frames to be generated may be determined based on the total storage available and user preferences. The video abstraction module 402 may set the amount of summary video frames automatically or may be configured by the user.

The video abstraction module 402 may generate the summary video frames based on a predetermined algorithm. For example, a practical and low-complexity video summary extraction algorithm may be used by the video abstraction module 402. The extraction algorithm may jointly consider various factors, such as summary representation, content variation coverage, and key frame and object visual quality, etc., and may construct a cost function for optimizing the summary frame indices. In other words, this algorithm converts the summary video frame extraction problem into an optimization problem and solves the optimization problem with a shortest path algorithm.

Assuming N denotes the number of total video frames in sequence, and M denotes the length of the expected video summary frames, then the problem is to find the indices of selected M frames $\{a_i\}$ (i=1, ..., M, and $a_0$=0) that can best summarize the video frame sequence. Here the "best" means that the summary frames would have desired local representation and covering content variation, and have desired visual quality for those objects to be presented to the user.

The desired local representation means the selected frames would have desired local similarity among its neighboring frames. In other words, the key frames (i.e., summary frames) would be similar enough to their neighbor frames so as to represent the neighbor frames in the final summary frame sequence. The similarity may be measured based various factors. For example, the color similarity may be used to evaluate the similarity among neighboring frames.

Provided that the $\{H_i\}$ denotes the YCbCr color histogram of a frame, then the frame local representation of the ith frame can be defined by $$A(i) = \begin{cases} Sim(H_{i-1}, H_i) & \text{if } i = N \\ \dfrac{Sim(H_{i-1}, H_i) + Sim(H_i, H_{i+1})}{2} & \text{otherwise,} \end{cases} \quad (1)$$

where Sim( ) is the similar function in comparing two 1-D vectors, and it can be defined by:

$$Sim(\vec{x}, \vec{y}) = \frac{\vec{x} \cdot \vec{y}}{\|\vec{x}\| \cdot \|\vec{y}\|}. \quad (2)$$

where x and y are vectors being compared.

The covering content variation can be interpreted by whether the consecutive frames in the selected summary frames have large dissimilarity. Assuming $\{L_i\}$ denotes the down-sampled 8×8 luminance image of the frame, then the similarity of summary frames can be defined by:

$$B(i, j) = \begin{cases} 0 & \text{if } i = 0 \\ \gamma Sim(H_i, H_j) + (1 - \gamma) Sim(L_i, L_j) & \text{otherwise,} \end{cases} \quad (3)$$

where γ is a weight factor having a value between [0, 1]. Here, the luminance similarity is also considered in order to detect the situations where object movements occur on a still or stable background.

Further, the desired visual quality may be interpreted by whether the selected frame has less blurriness (caused by the shifting of the camera) and the object/background in the selected frame have relatively low movements compared to its neighboring frames. The desired visual quality may be evaluated without referring to peak signal-to-noise ratio (PSNR) to avoid possibly misleading the key frame selection.

Assuming that $\{\|MV_i\|\}$ denotes the total length of the macroblock motion vectors, $\{S_i\}$ denotes the total macroblock SAD in the frame, and $\{F_i\}$ denotes the focus of the image that can be derived from the bit-stream or calculated from the frame, then the visual quality of the image can be defined by:

$$C(i) = \begin{cases} \eta \|MV_i\| S_i^2 + (1 - \eta)(F_{MAX} - F_i) & \text{if } i = N \\ \eta \dfrac{\|MV_i\| S_i^2 + \|MV_{i+1}\| S_{i+1}^2}{2} + (1 - \eta)(F_{MAX} - F_i) & \text{otherwise} \end{cases} \quad (4)$$

where η is a weighting factor with its value between [0, 1], and $F_{MAX}$ is a pre-assigned upper bound of the focus value.

Thus, a desired summary frame sequence would require having larger $$\sum_{i=1}^{M} A(a_i),$$

smaller $$\sum_{i=1}^{M} B(a_{i-1}, a_i),$$

and smaller $$\sum_{i=1}^{M} C(a_i).$$

The summary frame sequence selection can then be converted into an optimization problem that $$\text{Minimize} T(a_1, a_2, \ldots a_M) = \qquad (5)$$

$$\sum_{i=1}^{M} \{\alpha[1 - A(a_i)] + \beta B(a_{i-1}, a_i) + (1 - \alpha - \beta) C(a_i)\},$$

where α and β are weight parameters between [0, 1].

To solve the optimization problem, a cost function may be first created as:

$$G_k(a_k) = \underset{a_1, a_2, \ldots, a_M}{\text{Minimize}} T(a_1, a_2, \ldots, a_M). \qquad (6)$$

which represents the minimum sum up to and including frame $a_k$. Thus, $$G_M(a_M) = \underset{a_1, a_2, \ldots, a_{M-1}}{\text{Minimize}} T(a_1, a_2, \ldots, a_M), \qquad (7)$$

and $$\underset{a_M}{\text{Minimize}} G_M(a_M) = \underset{a_1, a_2, \ldots, a_M}{\text{Minimize}} T(a_1, a_2, \ldots, a_M). \qquad (8)$$

Because the cost function can be expressed recursively as:

$$G_{k+1}(a_{k+1}) = \underset{a_k}{\text{Minimize}} \{G_k(a_k) + \qquad (9)$$

$$\alpha[1 - A*(a_{k+1})] + \beta B(a_k, a_{k+1}) + (1 - \alpha - \beta) C(a_{k+1})\},$$

and given the cost function $G_{k-1}(a_{k-1})$, the selection of the next frame index $a_k$ is independent of the selection of the previous decision vectors $a_1, a_2, \ldots a_{k-2}$, and the algorithm is efficient.

That is, the recursive representation of the cost function above makes the future step of the optimization process independent from its past step, suitable for dynamic programming. This optimization problem can then be converted into a graph theory problem of finding the shortest path in a directed acyclic graph (DAG). The computational complexity of the algorithm is $O(NM^2)$.

However, under certain circumstances, the solution mentioned above may be infeasible, for example, when N and/or M are too large for the memory storage or the computational complexity is higher than the allocated power and CPU time. Therefore, the above solution may be adjusted to handle such circumstances. For example, in real-time processing, the video sequence may be divided into groups with a fixed window size, which keeps N in a relatively acceptable range and desired performance may be achieved.

More specifically, according to the adjusted solution, the video clip is divided into a number of shots and the optimal key frame locations inside each shot are located. The adjusted solution may include three major steps: shot boundary detection, shot compression ratio calculation, and optimized shot key frame selection. Because the algorithm of shot key frame selection has been demonstrated above, the details of the first two steps are described in the followings.

The shot boundary detection algorithm may be a color-histogram based solution in the YCbCr color space. According to the shot boundary detection algorithm, the similarity of the color-histogram of consecutive frames is first checked. When the similarity is below a pre-set threshold, which means a scene change might happen, the current location is recorded as a shot boundary. If the number of shot boundaries obtained is larger than the summary frames length, the boundary locations with the minimum location similarities are selected as the summary frame indices.

After the shot boundary detection, a motion activity based shot compression ratio calculation method may be used. Provided that P denotes the total number of divided shots, $\{N_i\}$ the length of each shot, and $\{M_i\}$ the summary length for each shot to be calculated, then $$M_i = 1 + \frac{\sum_{j=1+\sum_{k=1}^{i-1} N_k}^{\sum_{k=1}^{i} N_k} (\|MV_j\| S_j^2)}{\sum_{j=1}^{N} (\|MV_j\| S_j^2)} (M - P). \qquad (10)$$

Thus, the algorithm assigns longer summary length to shots with high-volume motion activities, and assigns fewer summary frames to shots with lower motion activities. This content-based strategy may be close to the human being's nature logic, and may generate different video summary frames compared to approaches using uniform sampling key frame selection, especially for clips with high contrast in content activity.

Further, after the summary video frames are generated, the object segmentation process may be performed on all the summary video frames or may be performed on certain selected key frames. Optionally, the object segmentation process may be done on every frame before the summary video frames are generated. Although such configuration may have a high computational complexity, the object segmentation may be used in the summary video frame generation process to result in high-quality key frame that reflect the desired object quality. The order of the summary video frame generation and the object segmentation may be determined by particular applications. In certain embodiments, a hybrid approach may be used, in which a rough process of video summary is performed first, then the object segmentation is performed on the roughly processed summary video frames, and then a final key frame selection is performed to achieve a better balance of computational complexity as well as the selected key frame quality.

The object segmentation module 404 may use any appropriate algorithm to perform the object segmentation process. For example, the object segmentation module 404 may use a theme-based object segmentation algorithm to reflect the observation that certain TV content links to a number of specific objects. For example, the fashion TV program typically links to the faces of celebrities, the celebrity's shoes, dress, bag, and jewels.

More particularly, the theme-based object segmentation algorithm may first lock the human faces or the head-shoulder area in an image, and then detect other objects according to the geometrical object relationship in the image. The theme-based object segmentation algorithm does not require accurate object boundary segmentation; instead detecting the bounding box of the object boundary may be sufficient. Further, the theme-based object segmentation algorithm may also allow the user to interfere the object segmentation process to more accurately identify the user's interest or preferences.

Further, as shown in FIG. 5, after the summary video frames are generated (S502), a hold command from the user may be detected by the control system 400 or UE handler 406 (S504). More particularly, when a user sees something interesting on TV, the user can stop the TV program by issuing a hold command. The user may issue the hold command in any proper way. For example, when the TV 102 is equipped with a depth-camera (e.g., Kinect-like device) allowing gesture control, the user may push the right hand in front and pause, and the depth-camera detects the gesture. The UE handler 406 may receive the detection from the depth-camera and may determine the hold command from the user. After determining the hold command, the UE handler 406 may pause the TV program (so that the paused TV program may restart from the paused or stopped point later) or may exit the TV program (so that the TV program can be started from current point later), and may switch the TV from watching mode to the shopping mode. That is, the UE handler 406 may stop the TV program and switch the operation mode. At the same time, the live TV program is being stored in the data storage 304 and may be resumed for the user using the time-shift functionality provided by the TV 102. Alternatively, the summary video frames may be generated after the hold command is detected.

After entering into the shopping mode, the user behavior analyzer 408 may determine a current interested theme, such as fashion, car racing, and golf, etc., according to the current TV content being watched as well as the user's past preference. After the current interested theme is determined, the theme-based object segmentation and video abstract process can be conducted on the past, for example, 2-minute of video frames, and a number of summary frames (e.g., 12 images) may be generated.

Further, the summary frames are presented to the user on the TV screen (S506). For example, the summary frames may be displayed in a rotating fashion for the user to select. The user can also use hand waving to move images forward and backward, and may select one frame to explore further.

The user selection on a particular summary frame may then be obtained by UE handler 406 (S508). After the selected frame is determined based on the user selection, the objects of the selected frame are presented to the user (S510). For example, a number of objects relevant to the theme of interest are highlighted, and the user can use hand wave to move around on these objects and make final selection of an object by holding a first and then opening hand. Of course, other ways of selection may also be used.

Afterwards, the user's selected object of interest is determined (S512), and information about the selected object is sent to the visual search engine 410 (S514). More specifically, UE handler 406 may send a search message containing the select object information to a backend process, and the backend process searches the object with visual search engine 410. The user may return to TV watching mode by resuming the paused TV program.

The backend process may use any appropriate searching criteria to search the selected object with visual search engine 410 and to find the brand and the lowest price merchandise on the market. The backend process may also use the recommendation engine 412 to automatically recommend a few relevant or similar merchandise, for example, merchandise with similar look and feel, similar price range, or ones people also purchase if purchasing the selected one, and so on. If the selected object is a human face, the person may be identified and the related pictures and latest news and piecework may also be demonstrated.

Visual search engine 410 may utilize the content-based image retrieval (CBIR) technology to perform online searching, such as searching retail catalogs. The CBIR may refer to any technology that in principle helps to organize digital picture archives by their visual contents. Thus, anything ranging from an image similarity function to a robust image annotation engine may be included in the CBIR technology.

Further, the system 500 may determine whether searching results are received (S516). When the backend process is completed, a message containing searching results is sent to the front end (e.g., UE handler 406). If it is determined that the searching results are not received (S516; No), the UE handler 406 may continue to wait for the message or issue a new search after a predetermined time period.

If it is determined that the searching results are received (S516; Yes), an alert message may be prompted to the user about the received results (S518). For example, the UE handler 406 may display a notification icon on the TV screen for the user.

The user can choose to wait until the TV program is over, or choose to open the icon right away and start shopping while holding the TV program. The UE handler 406 may determine whether the user chooses to continue shopping (S520). If it is determined that the user does not choose to continue shopping (S520; No), i.e., the user continue watching the TV program, the UE handler 406 may continue to wait for the user's selection of the icon after a predetermined time period.

On the other hand, if it is determined that the user chooses to continue shopping (S520; Yes), online shopping operations may be performed until the user completes the purchase (S522). For example, with similar hand gestures, the user can browse the recommended objects on screen and determine to purchase one (or more) by using a specific gesture (e.g., push, hold first and open hand), then the purchase order is made to the backend process.

The purchased merchandise may be shipped to the user with an invoice, and the user can determine to pay and keep the merchandise or return without payment. Other ways to handle the purchasing process, for example, linking the credit card information with TV when first launching the shopping service.

After the completion of purchase, the user may go back to the TV program again. It should be noted that, although the gesture control mechanism makes the switching between TV watching and shopping much easy and makes the shopping process convenient, it is merely an example and the disclosed user interaction model can be realized using other types of user interaction devices and mechanisms. Further, the shopping concept can also be extended to other services (for example, celebrity picture browsing) as long as it can be integrated into the TV watching experiences with the disclosed user interaction model.

By using the disclosed systems and methods, many advantageous applications can be implemented. For example, a rewind-pick-go TV shopping model can be realized to enable a natural user experience that mixes TV watching with TV shopping. The disclosed systems and methods can be extended to areas other than TV shopping, thus make TV a powerful device to entertain people's daily lives. The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. A method for an intelligent user-interaction control system, comprising:
generating a plurality of summary video frames for a certain time of incoming bit-stream of a video program to be shown on a display, according to a predetermined algorithm such that the plurality of summary video frames have desired local similarity among neighboring frames, desired covering content variation, and desired visual quality for a plurality of objects;
detecting a hold command from a user to stop the video program;
presenting the plurality of summary video frames to the user on the display after stopping the video program;
obtaining a user selection on a selected summary frame from the plurality of the summary video frames;
presenting the plurality of objects of interest segmented from the selected summary frame to the user on the display;
determining a user-selected object of interest from the plurality of objects of interest;
searching the selected object in an online database to obtain searching results corresponding to the selected object; and
prompting the user based on the searching results.

2. The method according to claim 1, further including:
recommending to the user with similar objects related to the selected object; and
performing a shopping operation with the user in response to the searching results.

3. The method according to claim 2, wherein:
the similar objects include merchandise with similar look and feel, similar price range, or objects people also purchase if purchasing the selected object.

4. The method according to claim 1, wherein:
the user uses gestures to issue the hold command, to select the summary frame, and to select the selected object of interest.

5. The method according to claim 1, wherein:
the local similarity is measured based the color similarity; and
provided that the $\{H_i\}$ denotes a YCbCr color histogram of a summary frame, N is a total number of frames in the certain time of video program, the local similarity A(i) of the i-th frame is defined by $$A(i) = \begin{cases} Sim(H_{i-1}, H_i) & \text{if } i = N \\ \dfrac{Sim(H_{i-1}, H_i) + Sim(H_i, H_{i+1})}{2} & \text{otherwise,} \end{cases}$$

where Sim( ) is a similar function in comparing two vectors, defined as $$Sim(\vec{x}, \vec{y}) = \dfrac{\vec{x} \cdot \vec{y}}{\|\vec{x}\| \cdot \|\vec{y}\|},$$

where x and y are vectors being compared.

6. The method according to claim 1, wherein generating the plurality of summary video frames further includes:
dividing the certain time of video program into a number of shots; and
generating summary video frames in each shot.

7. The method according to claim 6, wherein dividing and generating further includes:
detecting shot boundary using color histogram of consecutive frames of the video program indicating scene change in the video program such that the certain time of video program is divided along the shot boundary; and
assigning a longer summary length to shots with higher motion activities, and assigning a shorter summary length to shots with lower motion activities.

8. The method according to claim 1, further including:
performing an object segmentation process to obtain the plurality of objects interest.

9. The method according to claim 8, wherein performing an object segmentation process further includes:
applying a theme-based object segmentation algorithm to use certain TV content to determine the plurality of objects of interest.

10. The method according to claim 9, further including:
adding preference from the user in applying the theme-based object segmentation algorithm.

11. The method according to claim 1, wherein searching the selected object further includes:
sending information of the selected object to a visual search engine to search the online database; and
receiving the searching results from the visual search engine.

12. An intelligent user-interaction control system, comprising:
a data storage configured to store a certain time of incoming bit-stream of a video program to be shown to a user on a display;
an object abstraction module configured to generate a plurality of summary video frames for the certain time of incoming bit-stream of a video program, according to a predetermined algorithm such that the plurality of summary video frames have desired local similarity among neighboring frames, desired covering content variation, and desired visual quality for a plurality of objects;
a user experience (UE) handler configured to:
detect a hold command from the user to stop the video program;
present the plurality of summary video frames to the user on the display after stopping the video program;
obtain a user selection on a selected summary frame from the plurality of the summary video frames;
present the plurality of objects of interest segmented from the selected summary frame to the user on the display;
determine a user-selected object of interest from the plurality of objects of interest; and
a visual search engine configured to search the selected object in an online database and to return searching results corresponding to the selected object, wherein the UE handler is further configured to prompt the user based on the searching results.

13. The control system according to claim 12, further including:
a recommendation engine configured to recommend to the user with similar objects related to the selected object, wherein the UE handler is further configured to perform a shopping operation with the user in response to the searching results.

14. The control system according to claim 13, wherein:
the similar objects include merchandise with similar look and feel, similar price range, or objects people also purchase if purchasing the selected object.

15. The control system according to claim 12, further including:
a depth-camera enhanced remote control for allowing the user uses gestures to issue the hold command, to select the summary frame, and to select the selected object of interest.

16. The control system according to claim 12, wherein:
the local similarity is measured based the color similarity; and
provided that the $\{H_i\}$ denotes a YCbCr color histogram of a summary frame, N is a total number of frames in the certain time of video program, the local similarity A(i) of the i-th frame is defined by $$A(i) = \begin{cases} Sim(H_{i-1}, H_i) & \text{if } i = N \\ \dfrac{Sim(H_{i-1}, H_i) + Sim(H_i, H_{i+1})}{2} & \text{otherwise,} \end{cases}$$

where Sim( ) is a similar function in comparing two vectors, defined as $$Sim(\vec{x}, \vec{y}) = \frac{\vec{x} \cdot \vec{y}}{\|\vec{x}\| \cdot \|\vec{y}\|},$$

where x and y are vectors being compared.

17. The control system according to claim 12, wherein, to generate the plurality of summary video frames, the object abstraction module is further configured to:
divide the certain time of video program into a number of shots; and
generate summary video frames in each shot.

18. The control system according to claim 17, wherein the object abstraction module is further configured to:
detect shot boundary using color histogram of consecutive frames of the video program indicating scene change in the video program such that the certain time of video program is divided along the shot boundary; and
assign a longer summary length to shots with higher motion activities, and assign a shorter summary length to shots with lower motion activities.

19. The control system according to claim 12, further including:
an object segmentation module configured to perform an object segmentation process to obtain the plurality of objects interest.

20. The control system according to claim 19, wherein the object segmentation module is further configured to:
apply a theme-based object segmentation algorithm to use certain TV content to determine the plurality of objects of interest.

21. The control system according to claim 20, further including:
a user behavior analyzer configured to add preference from the user in applying the theme-based object segmentation algorithm.

* * * * *